United States Patent
Zahavi et al.

[11] Patent Number: 6,023,040
[45] Date of Patent: Feb. 8, 2000

[54] LASER ASSISTED POLISHING

[75] Inventors: Dov Zahavi, 18 Eilat Street, Haifa 32298, Israel; Shoshana Tamir, Haifa, Israel

[73] Assignee: Dov Zahavi, Haifa, Israel

[21] Appl. No.: 09/164,362

[22] Filed: Oct. 1, 1998

[30] Foreign Application Priority Data

Oct. 6, 1997 [IL] Israel ........................................ 121890

[51] Int. Cl.[7] .................................................. B23K 26/08
[52] U.S. Cl. .................................. 219/121.69; 219/121.85
[58] Field of Search ......................... 219/121.61, 121.62, 219/121.68, 121.69, 121.73, 121.8, 121.85; 264/400

[56] References Cited

U.S. PATENT DOCUMENTS

| | | |
|---|---|---|
| 4,190,759 | 2/1980 | Hongo . |
| 4,752,668 | 6/1988 | Rosenfield et al. ................ 219/121.68 |
| 4,822,975 | 4/1989 | Torigoe .............................. 219/121.85 |
| 4,986,664 | 1/1991 | Lovoi .............................. 219/121.62 X |
| 5,118,917 | 6/1992 | Krieken et al. ................ 219/121.85 X |
| 5,173,441 | 12/1992 | Yu et al. . |
| 5,331,131 | 7/1994 | Opdyke .............................. 219/121.69 |
| 5,483,038 | 1/1996 | Ota et al ............................ 219/121.69 |
| 5,504,303 | 4/1996 | Nagy .................................... 219/121.68 |
| 5,624,436 | 4/1997 | Nakamura et al. . |
| 5,742,026 | 4/1998 | Dickinson, Jr. et al. .......... 219/121.69 |

FOREIGN PATENT DOCUMENTS 6-170571   6/1994   Japan .

OTHER PUBLICATIONS

R.S. Patel, S. Mukkavilli and A. Kumar; "Grazing Angle Laser Planarization for multi–level Thin Film Structure", ISHM '95 Proceedings; pp. 31–35.

*Primary Examiner*—Gregory Mills
*Attorney, Agent, or Firm*—Nath & Associates; Gary M. Nath; Gregory B. Kang

[57] ABSTRACT

A method for laser assisted polishing of a material layer to a desired surface, the method including the steps of setting up a laser beam in an XYZ coordinate system to ablate spurious material from the material layer at the desired surface and thereabove and scanning the laser beam across the material layer such that consecutive laser beam irradiate at least partially non-overlapping portions of the material layer and laser beam pulses from different directions in the XYZ coordinate system successively irradiate a given area of the material layer.

8 Claims, 5 Drawing Sheets

LASER ASSISTED POLISHING

FIELD OF THE INVENTION

The invention relates to a method for laser assisted polishing and is particularly suitable for semiconductor manufacturing technology.

BACKGROUND OF THE INVENTION

Conventional semiconductor manufacturing techniques include the deposition of a dielectric layer on a feature layer whereupon the dielectric layer has an initially non-planarized surface whose topography largely matches that of its underlying feature layer and which may also have surface irregularities due to manufacturing limitations.

To achieve high feature density, a dielectric layer has to be planarized to a high degree of global planarity hitherto achieved using chemical mechanical polishing (CMP) technology, however, this suffers from several drawbacks including inter alia a CMP machine requires a large clean-room floor space and consumes large quantities of costly consumables; operational difficulties due to abrasion being affected by several factors including die location, spacing between features, pad condition and slurry distribution.

In an article entitled "Grazing Angle Laser Planarization Process for Multi-Level Thin Film Structure" by Patel et al, IBM Microelectronics Division, SPIE ISHM '95 Proceedings, pages 31–35, there has been proposed laser assisted planarization by means of a laser beam intensively ablating local protrusions at a low incidence angle.

SUMMARY OF THE INVENTION

In accordance with the present invention, there is provided a method for laser assisted polishing of a material layer to a desired surface, the method comprising the steps of:

(a) setting up a laser beam in an XYZ coordinate system to ablate spurious material from the material layer at the desired surface and thereabove; and (b) scanning the laser beam across the material layer such that consecutive laser beam pulses irradiate at least partially non-overlapping portions of the material layer and laser beam pulses from different directions in the XYZ coordinate system successively irradiate a given area of the material layer.

The present invention is based on the notion that a laser beam can buff a material layer to a desired surface with laser beam pulses having an average emergent fluence at the desired surface substantially equal to the material layer's laser ablation threshold on fulfilling two requirements: First, consecutive laser beam pulses do not irradiate the same portion of the material layer thereby taking advantage of the photochemical nature of laser ablation whilst precluding undesirable thermal stresses which typically occur due to the same portion being successively irradiated by two or more consecutive laser beam pulses. And second, laser beam pulses from different directions in the XYZ coordinate system successively irradiate a given area of the material surface to avoid residual tracks indicative of a scan pattern of a laser beam thereacross.

However, the manner in which a material layer can be most efficiently polished depends on a number of factors including inter alia the quantity and topography of the spurious material to be ablated, the degree of overlapping between a laser beam pulses' footprints, and the like such that the total area of a laser beam pulses' footprints irradiating a material layer divided by its area typically lies in the range of about 1.5 to about 10. In particular, stronger average emergent fluences can be initially employed to ablate top portions of relatively high protrusions which are preferably ablated in a sequential slice-by-slice fashion with progressively weaker average emergent fluences being employed towards the desired surface.

In semi-conductor manufacturing technology, it is envisaged that the method of the present invention can be employed for planarization of semiconductor wafers at a global planarity of about 0.1 $\mu$m which is comparable to that hitherto achieved by conventional CMP technology. However, the proposed method is a dry process which can be effected in a process chamber attached to a cluster machine thereby saving cleanroom space and handling requirements whilst improving cleanliness, yield and reliability.

BRIEF DESCRIPTION OF THE DRAWINGS

In order to understand the invention and to see how it may be carried out in practice, a preferred embodiment will now be described, by way of a non-limiting example only, with reference to the accompanying drawings, in which.

DETAILED DESCRIPTION OF THE DRAWINGS

Figure 1:
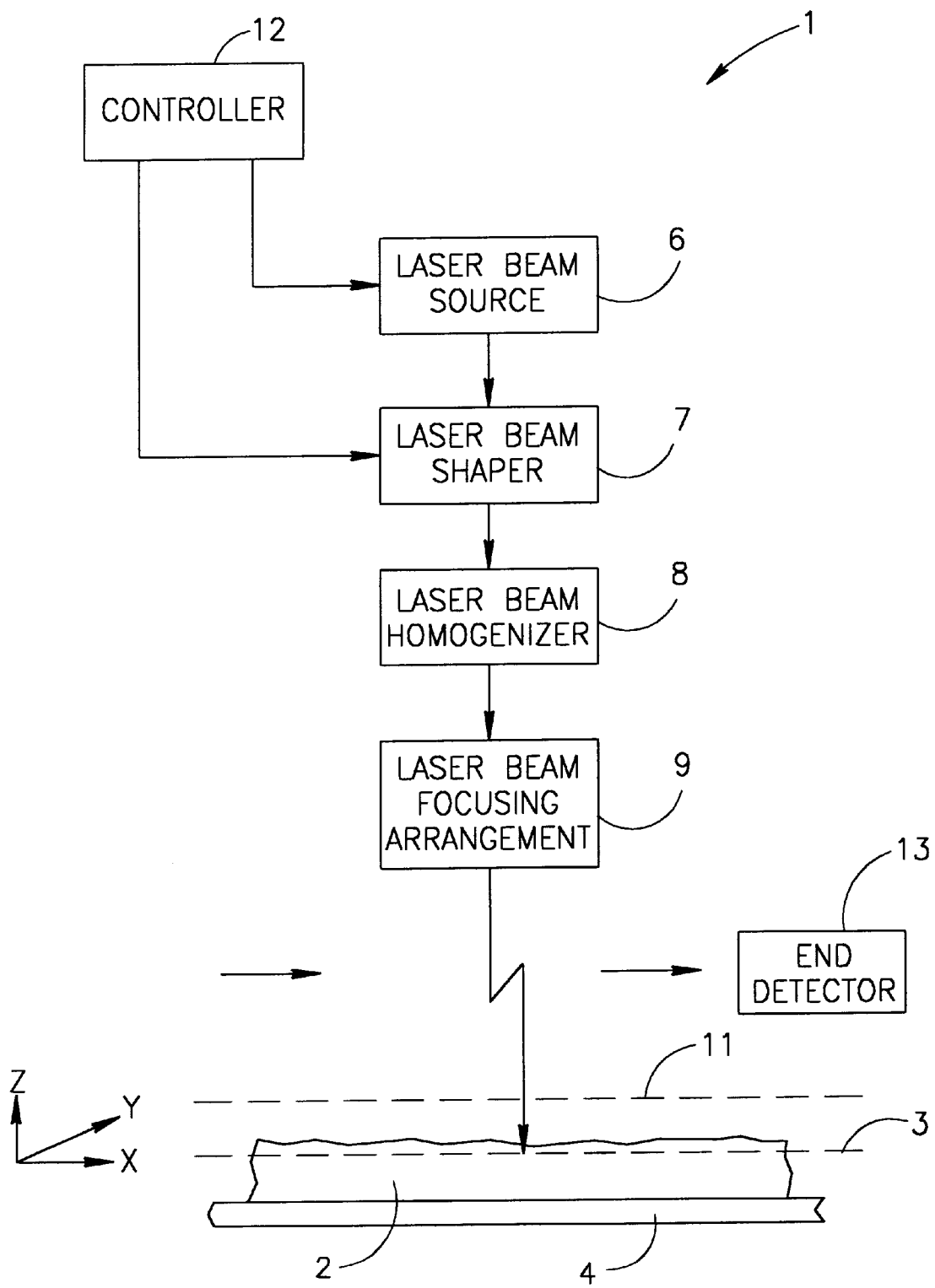
FIG. 1 is a schematic diagram of apparatus for laser assisted polishing of a material layer in accordance with a method of the present invention.

FIG. 1 shows apparatus 1 for laser assisted polishing of a material layer 2 to a desired surface 3 in this case constituting an XY plane of an XYZ coordinate system. The material layer 2 is mounted on a variable speed platen 4 displaceable in X and Y directions thereby enabling its displacement relative to the apparatus 1. The laser assisted polishing is facilitated by a flow of a reactive process gas which also entrains ablated material to preclude its re-deposition on the material layer 2.

The apparatus 1 includes a laser beam source 6 for emitting a laser beam co-directional with the Z axis of the XYZ coordinate system for ablating spurious material from the material layer 2 at and above the desired surface 3. The laser beam transverses a laser beam shaper 7, a laser beam homogenizer 8 and a laser beam focussing arrangement 9 for focussing the shaped and homogenized laser beam to a focal plane 11 above the desired surface 3.

A controller 12 controls the laser beam source 6 to adjust its operating power and the laser beam shaper 7 to adjust the size and shape of the focal plane 11 for determining its cross section area thereby controlling the average emergent fluence of the laser beam at the focal plane 11 and therefore at the desired surface 3. In addition, the controller 12 controls the laser beam source 6 to adjust its laser beam pulse delivery rate and the platen 4 thereby effectively controlling the location of consecutive laser beam footprints on the material layer 2.

An end detector 13 of the residual gas analyzer (RGA) type monitors the contents of the reactive process gas for initiating the polishing of each slice of a slice-by-slice polishing of a material layer 2 at successively lower altitudes and terminating its polishing at the desired surface 3.

Figure 2:
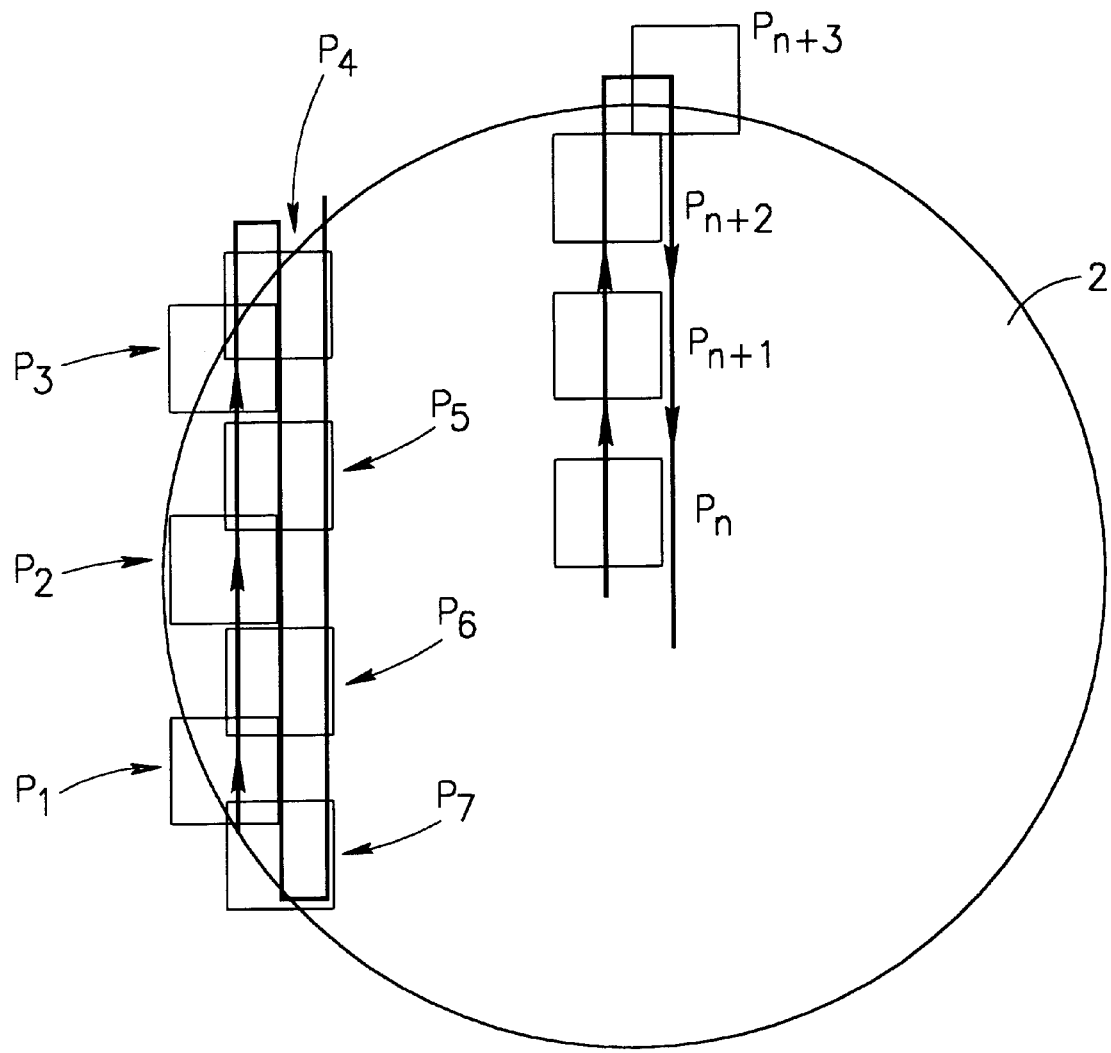
FIG. 2 is a top view of a material layer showing the footprints of consecutive laser beam pulses in accordance with the method of the present invention.
Figure 3A:
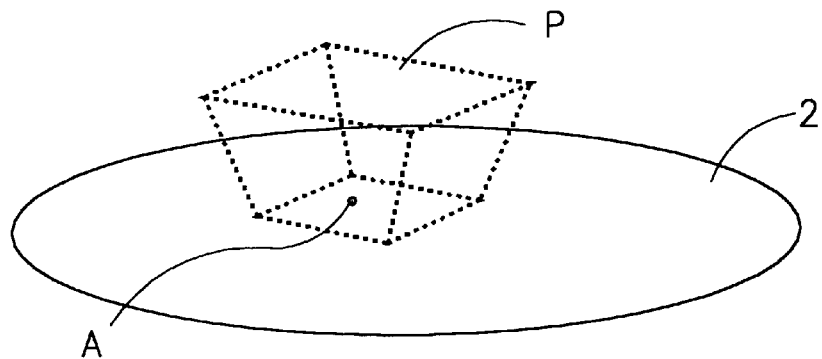
FIG. 3A–3C are pictorial views of a material layer showing the successive irradiation of a given area in accordance with the method of the present invention.
Figure 3B:
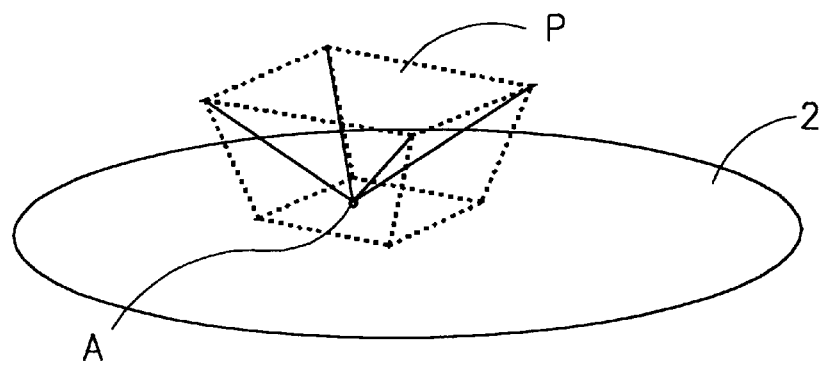
Figure 3C:
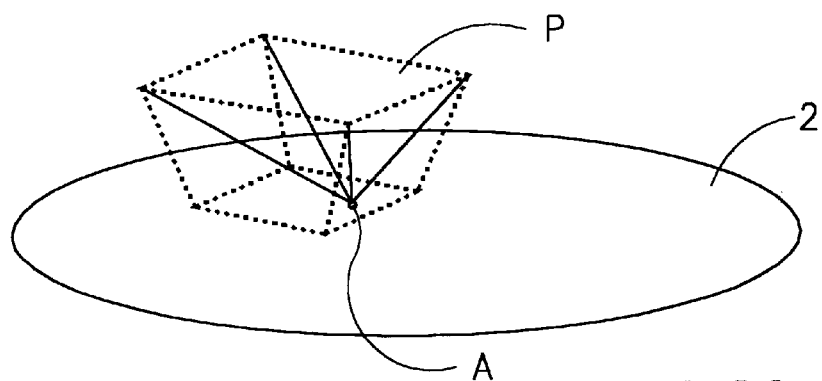

In operation, the platen 4 is continuously moved to scan the entire surface of the material layer 2 such that consecutive laser beam pulses $P_1$, $P_2$, . . . $P_n$ irradiate non-overlapping portions of the material layer 2 (see FIG. 2) and a given area A is successively irradiated by typically non-consecutive laser beam pulses P originating from different locations in the XYZ coordinate system (see FIGS. 3A–3C).

Figure 4:
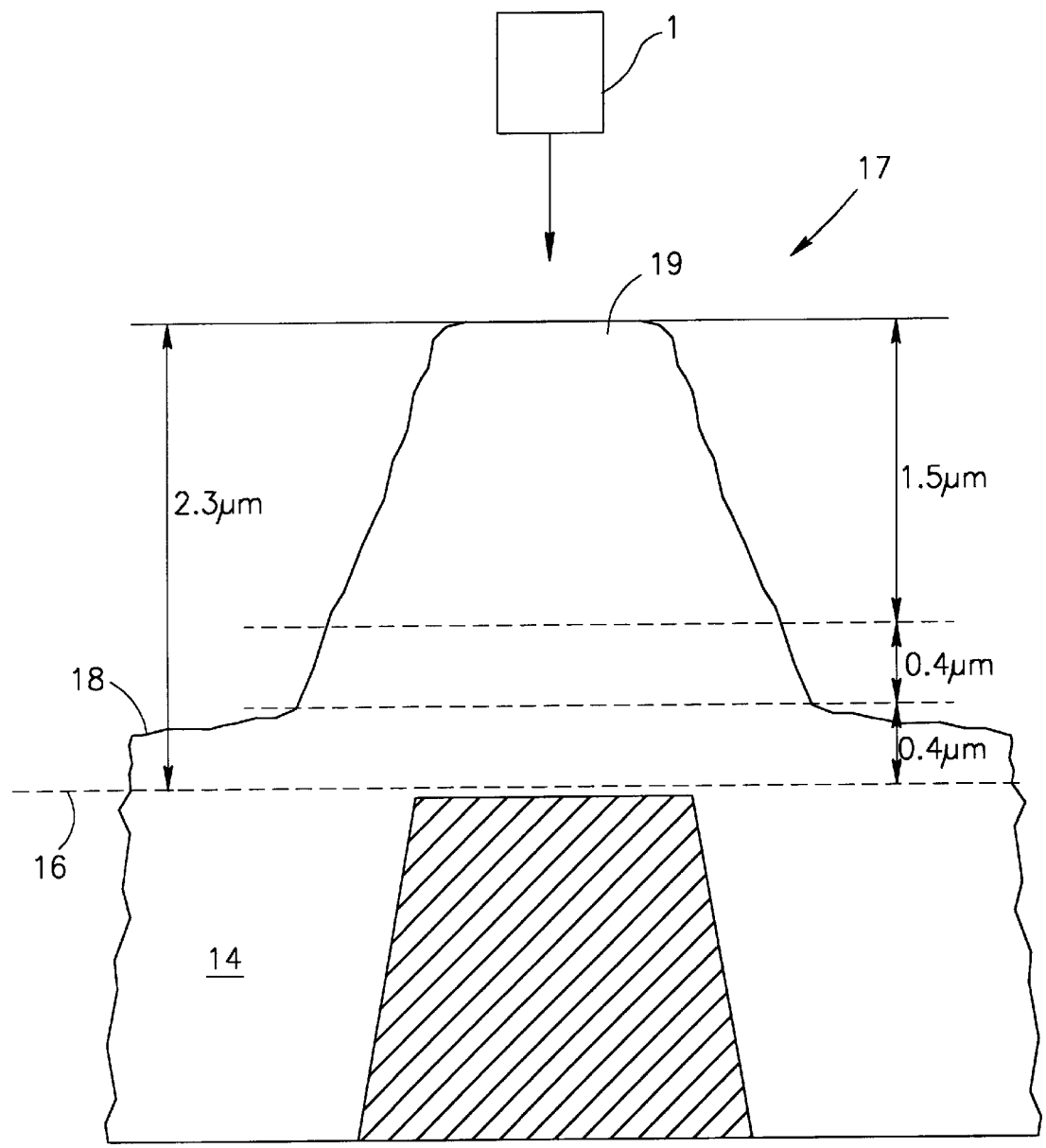
FIG. 4 is a pictorial view showing a slice-by-slice planarization of a polyimide layer of a semiconductor wafer in accordance with the method of the present invention.

In FIG. 4, apparatus 1 is employed for laser assisted planarization of a polyimide layer 14 constituting a material layer with a laser ablation threshold of about 75 mJcm$^{-2}$ to a desired globally planarized surface 16. A polyimide layer 14 of a typical semiconductor wafer 17 with generally low lying spurious material 18 may include generally pyramidal shaped protrusions 19 of height 2.3 µm with a total top area of about 50 cm$^2$ of a 700 cm$^2$ wafer area.

Using an 400 mJ 308 nm excimer laser beam source having an 10 mm by 20 mm aperture and an 200 laser beam pulse per second delivery rate at its maximum power and highest pulse beam delivery rate and moving the wafer 17 relative to the apparatus 1 at 5 ms$^{-1}$, an exemplary specification for the laser assisted polishing of the polyimide layer 14 to a desired global planarity of 0.1 µm is as follows:

(i) employing 700 pulses having an 15×15 mm$^2$ focal plane and an average emergent fluence of 140 mJcm$^{-2}$ over 3.5 seconds for ablating each of fifteen 0.1 µm thick upper slices for ablating a total of 1.5 µm over a period of 53 seconds;

(ii) employing 450 pulses having an 18×18 mm$^2$ focal plane and an average emergent fluence of about 100 mJcm$^{-2}$ over 2.5 seconds for ablating each of eight 0.05 µm thick middle slices for ablating a total of 0.4 µm over a period of 14 seconds; and (iii) employing 350 pulses having an 20×20 mm$^2$ focal plane and an average emergent fluence of about 80 mJcm$^{-2}$ over 1.75 seconds for ablating each of forty 0.01 µm thick lower slices for ablating a total of 0.4 µm over a period of 70 seconds.

During planarization of the 0.1 µm and 0.05 µm slices, the laser beam pulses concurrently planarize the surrounding low lying spurious material 18 since their average emergent fluence at the desired globally planarized surface 16 are about 110 mJcm$^{-2}$ and 85 mJcm$^{-2}$, respectively.

While the invention has been described with respect to a limited number of embodiments, it will be appreciated that many variations, modifications and other applications of the invention can be made by those ordinarily skilled in the art for a wide range of applications including inter alia semiconductor manufacturing, polishing elements including optical elements to desired spherical and cylindrical surfaces, and the like.

Figure 5:
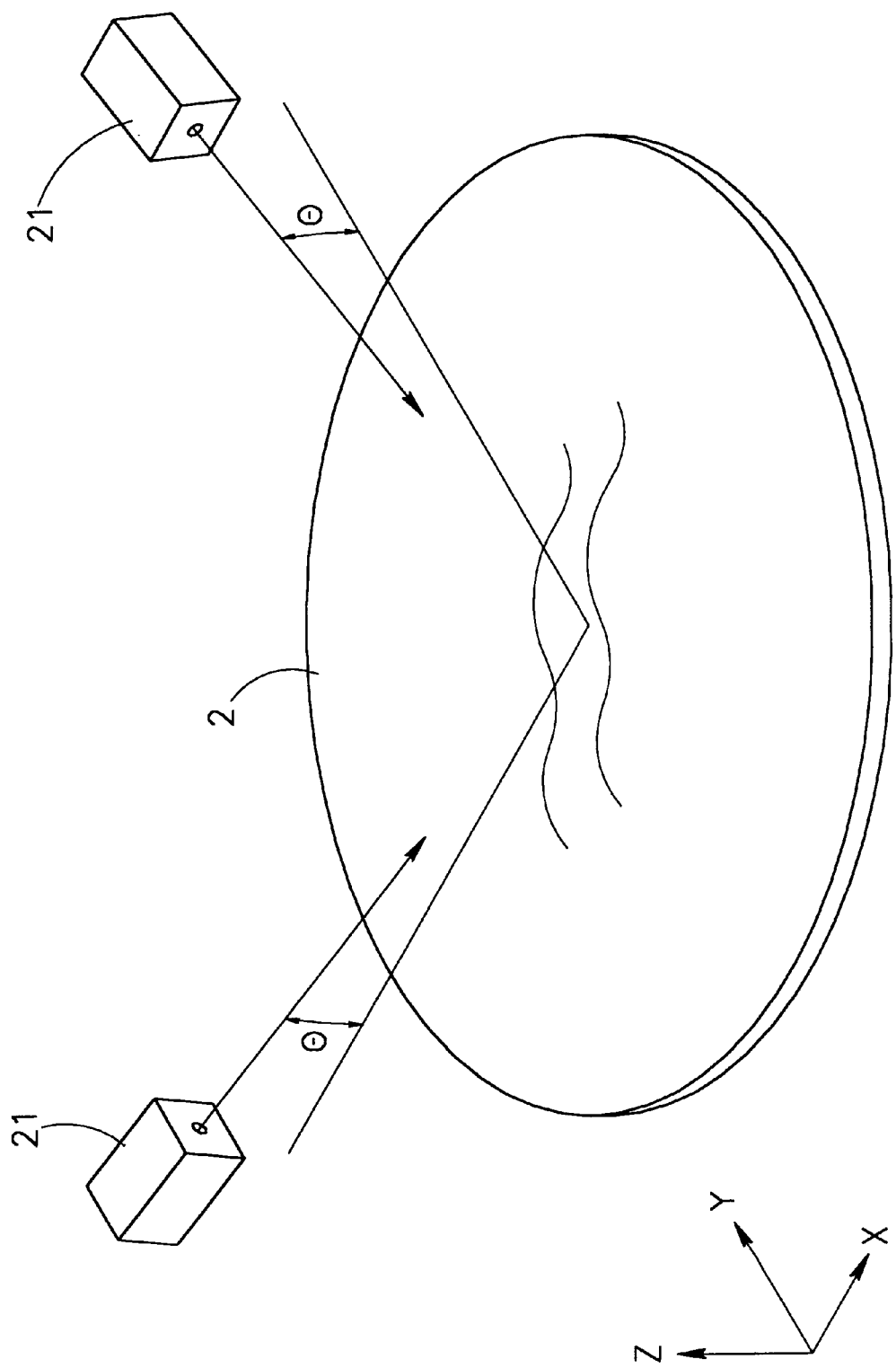
FIG. 5 is a pictorial view of an alternative embodiment of apparatus for laser assisted polishing of a material layer in accordance with the method of the present invention.

For example, apparatus 21 can irradiate a material layer 2 at a low incident angle θ of about 20 ° relative to the XY plane of the XYZ coordinate system (see FIG. 5). In addition, such apparatus 21 can be rotatable about the Z axis of the XYZ coordinate system.

Also, a laser beam can scan a material layer in accordance with a wide range of pseudo-random scanning patterns including inter alia Lissajous patterns which may include consecutive laser beam pulses irradiating partially overlapping portions of a material layer.

We claim:

1. A method for laser assisted polishing of a material layer to a desired surface, the method comprising the steps of:

(a) setting up a laser beam to ablate spurious material from the material layer at the desired surface and thereabove;

(b) scanning the laser beam across the material layer such that consecutive laser beam pulses irradiate substantially non-overlapping portions of the material layer and laser beam pulses from substantially different directions successively irradiate a given area of the material layer; and (c) repeating steps (a) and (b) for two or more consecutively lower altitudes above the desired surface whereupon the laser beam has an average emergent fluence substantially equal to the laser ablation threshold of the material layer, at least the lowermost altitude coinciding with the desired surface.

2. The method according to claim 1 wherein initially stronger average emergent fluences ablate spurious material at higher altitudes and progressively weaker average emergent fluences ablate spurious material at successively lower altitudes.

3. The method according to claim 1 wherein step (a) includes adjusting the power of the laser beam for determining the average emergent fluence of the laser beam at the desired surface.

4. The method according to claim 1 wherein step (a) includes adjusting the cross section area of a focal plane of the laser beam for determining the average emergent fluence at the desired surface.

5. The method according to claim 1 wherein the total area of the footprints of laser beam pulses irradiating the material layer divided by the area of the material layer lies in the range of about 1.5 to about 10 at each of said altitudes above the desired surface.

6. The method according to claim 1 wherein consecutive laser beam pulses irradiate wholly non-overlapping portions of the material layer.

7. The method according to claim 1 wherein the laser beam and the material layer are rotatable and translatable one with respect to the other and the laser beam irradiates the material layer at a low incident angle relative thereto whereby a given area of the material layer is irradiated from different directions by consecutive pulses.

8. The method according to claim 1 wherein the laser beam has a relatively large footprint of several millimeters by several millimeters whereby a given area of the material layer is irradiated from different directions by consecutive pulses.

\* \* \* \* \*